United States Patent
Sá Alves Da Silva et al.

(10) Patent No.: US 12,275,844 B2
(45) Date of Patent: Apr. 15, 2025

(54) PROCESS FOR THE PRODUCTION OF A FORMULATION CONTAINING POLY(LACTIC ACID) AND ALIPHATIC AND/OR AROMATIC POLYESTERS AND PRODUCTS USING IT

(71) Applicants: Sicor—Sociedade Industrial de Cordoaria, SA, Cortegaça Ovr (PT); Universidade de Coimbra, Coimbra (PT)

(72) Inventors: Augusto Sá Alves Da Silva, Esmoriz (PT); Rafael Alexandre Costa Rebelo, Moimenta da Beira (PT); Jorge Fernando Jordão Coelho, Coimbra (PT); Arménio Coimbra Serra, Coimbra (PT); Camila Tebaldi Marques, Valongo (PT)

(73) Assignees: SICOR-SOCIEDADE INDUSTRIAL DE CORDOARIA, Cortegaca Ovr (PT); SA UNIVERSIDADE DE COIMBRA, Coimbra (PT)

( * ) Notice: Subject to any disclaimer, the term of this patent is extended or adjusted under 35 U.S.C. 154(b) by 330 days.

(21) Appl. No.: 17/655,043

(22) Filed: Mar. 16, 2022

(65) Prior Publication Data
US 2022/0204756 A1  Jun. 30, 2022

Related U.S. Application Data

(63) Continuation of application No. PCT/IB2020/058606, filed on Sep. 16, 2020.

(30) Foreign Application Priority Data

Sep. 16, 2019 (PT) .......................... 115781

(51) Int. Cl.
| | | |
|---|---|---|
| B29C 48/00 | (2019.01) | |
| B29C 48/08 | (2019.01) | |
| B29C 48/91 | (2019.01) | |
| C08J 3/00 | (2006.01) | |
| C08L 67/04 | (2006.01) | |
| D01D 5/12 | (2006.01) | |
| D01D 5/42 | (2006.01) | |
| D01F 6/92 | (2006.01) | |
| D01F 6/96 | (2006.01) | |
| B29K 67/00 | (2006.01) | |
| B29L 7/00 | (2006.01) | |

(52) U.S. Cl.
CPC .......... *C08L 67/04* (2013.01); *B29C 48/0018* (2019.02); *B29C 48/0022* (2019.02); *B29C 48/08* (2019.02); *B29C 48/91* (2019.02); *C08J 3/005* (2013.01); *D01D 5/12* (2013.01); *D01D 5/423* (2013.01); *D01F 6/92* (2013.01); *D01F 6/96* (2013.01); *B29K 2067/046* (2013.01); *B29L 2007/007* (2013.01); *C08J 2367/04* (2013.01); *C08J 2467/00* (2013.01); *C08L 2203/12* (2013.01); *C08L 2205/025* (2013.01)

(58) Field of Classification Search
CPC .. C08L 67/04; C08L 67/06; C08J 3/00; D01D 5/42; D01D 5/12; D01F 6/92; D01F 6/96; B29C 48/00; B29C 48/08; B29C 48/91
See application file for complete search history.

(56) References Cited

U.S. PATENT DOCUMENTS

| | | | | |
|---|---|---|---|---|
| 2013/0137788 | A1* | 5/2013 | Yamamura | ................ C08J 5/18 521/134 |
| 2019/0125020 | A1* | 5/2019 | Tsukahara | ................ D01F 1/07 |

FOREIGN PATENT DOCUMENTS

| | | | | |
|---|---|---|---|---|
| WO | 2011322685 | * | 5/2012 | ............. C08L 67/04 |

\* cited by examiner

*Primary Examiner* — Christopher M Rodd
*Assistant Examiner* — Shibin Liang
(74) *Attorney, Agent, or Firm* — Frank Gao, Esq.

(57) ABSTRACT

The invention presented in this document relates to processes for the preparation of a formulation containing poly (lactic acid) (PLA) and aliphatic and/or aromatic polyesters which plasticize it, and its use in monofilaments and films. The presence of polyesters does not remove the biodegradability and composting characteristics of the raw materials used in the formulation. The invention also concerns products that use the formulation.

10 Claims, No Drawings

PROCESS FOR THE PRODUCTION OF A FORMULATION CONTAINING POLY(LACTIC ACID) AND ALIPHATIC AND/OR AROMATIC POLYESTERS AND PRODUCTS USING IT

TECHNICAL FIELD OF THE INVENTION

The invention presented in this document relates to a process for the preparation of a formulation containing poly(lactic acid) (PLA), mixed with a few aliphatic and/or aromatic polyesters and other agents, as well as products using it, which guarantees them some plasticity, in the forms of raffia tapes and monofilament (continuous cylindrical filament) enabling the use of this biodegradable material in activities wherein polyolefin-based materials such as polypropylene (PP) and polyethylene (PE) or mixtures of these two polymers are normally used.

Poly(lactic acid) (PLA) is a biodegradable aliphatic polyester with thermoplastic characteristics, derived from the polymerization of lactic acid obtained by fermentation, which translates into a material of renewable origin. It is one of the most promising polymers as a replacement material for polyolefin polymers. PLA also has similar mechanical properties to polyethylene terephthalate (PET), which is one of the most widely used polymers in packaging design.

The development of biodegradable polymers has been of extensive interest in recent years, especially in sectors such as agriculture and fisheries. In these markets there is a need to obtain materials resistant to traction in the form of raffia tapes and monofilament for the production of yarns, ropes, nets, meshes, films, among others, for use in these areas closer to the nature. This is a market where the biodegradability of the product is an important characteristic to be valued. Currently, in these markets the products are made of non-biodegradable polymers, so that annually the level of soil contamination is high. The way to remedy this situation will be by introducing products made of biodegradable materials such as PLA.

PLA has high structural stiffness due to its high glass transition temperature and has little flexibility, making it unsuitable for use in its pure form on many of the manufactured articles, since it becomes very brittle. Thus there is a need to change these intrinsic characteristics of PLA by introducing other materials that increase its ductility without impairing its excellent mechanical characteristics. It is thus a question of finding processes for plasticizing the PLA. At the same time, the plasticization process usually introduces significant changes in the PLA processing for the different final forms. The plasticizing agents can be of various types and a few solutions for their incorporation into the PLA to obtain fibers similar to PP or PE are already known in the state of the art.

CONTEXT OF THE INVENTION

The consumption and the generation of solid plastic waste have been increasing considerably. Most plastic items sold, especially packaging and other non-durable goods, become waste in less than a year or, in the worst-case scenario, after a single use. The large volume of plastic materials discarded after consumption and the environmental impacts caused by incorrect disposal of waste with high resistance to degradation, which are generally not biodegradable and remain in the environment for many years, are just a few of the problems to be mentioned. The large amount of solid waste generated by packaging disposal, the use of petroleum-based polymers, the increased release of greenhouse gases and the future scarcity of oil are factors discussed in studies that propose more environmentally friendly alternatives regarding the issues of the generated negative environmental impact.

The so-called sustainable and eco-efficient plastics are the focus of several studies in the 20th and 21st centuries because they stand out as substitutes to conventional plastics in segments where recycling is costly, laborious and leads to materials with low cost and performance. Polymers based on natural renewable resources, which are called biopolymers, and biodegradable polymers are the basis of the study in this area. The interest in these polymers seeks to reduce the use of oil resources and to limit the contribution of non-degradable plastic in waste disposal.

Commercially important biodegradable polymers can be produced from natural sources or from petroleum, with the emphasis on those produced by chemical synthesis from bio-derived monomers such as poly(lactic acid) (PLA) and those produced from crude oil, such as a few aliphatic and/or aromatic polyesters.

PLA consists of a polymer formed from the condensation polymerization of lactic acid. This in turn can be synthesized via fermentation or chemical reaction. In fermentation, lactic acid can be synthesized by lactose with the *Bacillus lactis ácidi* bacterium or from starch, glucose or sucrose using the *Bacillus delbrücki* bacterium.

Agricultural crops can be used as a source of biopolymer production, but they depend on massive industrial production, which can jeopardize the overall productive potential since it uses essential resources to feed living beings and may raise problems of limiting these resources. However, in order to avoid the exhaustion of food sources, the reuse of waste generated by the agri-food industry, taking into account the amount of products that are discarded, has been used to obtain biopolymers.

Currently, the main application of PLA is in packaging. PLA could have broader application if its physical, mechanical and thermal properties were optimized, which has been leading to studies of PLA mixtures with aliphatic and/or aromatic polyesters.

As it is a biodegradable polymer, the final destination of PLA is sustainable and there are several possible forms of final destination, the most common being composting or incineration in plants intended for that purpose, since as these processes are carried out at temperatures above the glass transition temperature (Tg) of PLA (55-60° C.), their degradation is easier. The same does not happen in the soil or in PLA waste disposed of in landfills, which will degrade at a very slow rate thus losing the advantage of PLA's biodegradability. Since aliphatic and/or aromatic polyesters have a Tg below room temperature, mixtures of PLA with these polymers can allow for their easier degradation in the soil or in landfill.

Given the biodegradability of PLA, the replacement of a number of polypropylene (PP) or polyethylene (PE) base products, namely yarns and nets used in the agriculture and fishing sectors, by others of PLA would be extremely important, since they are a source of pollution for soils and oceans due to their very poor degradability. For this purpose, tests were conducted to obtain PLA-based film and monofilament with good elongation and tenacity characteristics for the production of yarns, ropes, nets and meshes. A mixture was developed containing aliphatic and/or aromatic polyesters and other agents that enable exploiting PLA as a base material to obtain quality products for the most diverse applications in the most diverse sectors of the economic activity.

BACKGROUND OF THE INVENTION

Some documents were found that mention the plasticization of PLA and its use in various products. However, no document has been found which refers to the same or an identical solution as that presented in this document.

U.S. Pat. No. 8,461,262 describes the plasticization of PLA with the use of polyethylene glycol (PEG), also using a modified polyolefin-based compatibilizing agent, having a few reactive groups such as amides, organic acids or anhydrides, with the material being used for the manufacture of fibers.

U.S. Pat. No. 8,188,185 mentions the plasticization of PLA by the addition of thermoplastic starch, with the percentage of PLA not exceeding 30%. The addition of up to 60% of an aliphatic and/or aromatic polyester to the mixture is also necessary. This material is used for the film production.

Document JP-A-2004/115051 discloses the tape processing of a mixture containing 10 to 45% PLA by weight and an aliphatic-aromatic copolyester, with its processing showing irregularities on at least one side. This material is used for packaging tapes.

U.S. Pat. No. 6,399,197 describes the processing of a monofilament with good mechanical properties with a PLA-based mixture. The added polymer is an aliphatic polyester, other than PLA, and the ratios of PLA to polyester, by mass, may range from 61/39% to 95/5%, respectively. The presence of these polymers increases the flexibility and elongation at break of the PLA. The aliphatic polyester may also have a different structure and may even have two different structures. This material is extruded in monofilament and can be used for racket strings.

Document U.S. Pat. No. 5,883,199 mentions the plasticization of PLA using aliphatic polyesters wherein carboxylic acid contains carbon chains, from $C_2$ to $C_{20}$. This material can be used for films and bags.

In WO2017/130094, the use of a polyolefin-based granulate with a long-chain branched alcohol, processed into granules and added to the PLA is mentioned. This formulation serves as a plasticizer for PLA, with the percentage of granule added being up to 25%. This material is used for film or monofilament extrusion.

Patent EP2379641 describes the processing of PLA yarns or tapes, containing more than 95% PLA by mass. According to this document, the material is stretched at least in the machine direction in the ratio of 1:4 or more. The resulting material can be used in horticulture to tie up plants.

ADVANTAGES OF THE INVENTION

From the PLA, raffia tape can be produced, which can originate yarns for various purposes as described in patent EP2379641. The advantages of using PLA for incorporation in materials of current use are numerous and include the much higher biodegradability and absence of toxic byproducts of that degradation consisting of the initial monomer, lactic acid. However, the possibility of making ropes and products from not raffia tape but monofilament is not possible with PLA only given the characteristics of the process and PLA's rigid nature. The introduction of a polyester-type copolymer with PLA and the process developed, described in this invention, enables the production of monofilament and also paves the way to obtaining raffia tape with properties superior to those of the material obtained with PLA only, namely the increase in the breaking strength and elongation of the material. The introduction of polyester-type copolymers in the formulation with PLA changed the material's fluidity index and melting point, which required the development of a new and specific production process, also an object of this patent. The invention made up of the new material and the manufacturing process makes it possible to obtain a tougher product, more resistant to high temperatures, capable of being used, in addition to horticultural yarns, on meshes, but especially on ropes and nets for the fishing sector, where the requirements of tensile strength, good resistance to abrasion, chemical action and ultraviolet rays are fundamental characteristics to consider when choosing products.

SUMMARY OF THE INVENTION

The invention described in this document mentions the process of obtaining a granulated biopolymer obtained from a formulation containing poly(lactic acid) (PLA) and aliphatic and/or aromatic polyesters, which gives it the right plasticity for its processing into monofilaments and films, enabling it to be used in the production of, for example, but not limited to, yarns, ropes, nets and meshes.

The quantity of PLA present in the mixture is between 46% and 94%, preferably 70%, the remaining percentage being composed of aliphatic and/or aromatic polyesters and a few agents, used in smaller quantities, commonly used industrially in the processing of monofilaments and films. The mixture obtained, when processed, has the properties necessary for the formation of films and monofilaments to be used in the production of, for example, but not limited to, yarns, ropes, nets and screens, with which it is possible to manufacture, for example: yarns for straw baling, yarns for agriculture, horticulture, fruit farming and vegetable growing, awnings, hail protection, anti-bird nets, fishery products such as fishing lines and nets, sailing ropes, etc.

DETAILED DESCRIPTION OF THE INVENTION

"Raffia tape" means tape or film of polymeric material capable of fibrillation after further processing.

"Monofilament" means continuous filament usually with a circular section with a diameter greater than 100 µm.

"Yarn" means the twisted entity composed of monofilaments, fibers or fibrillated films (raffia tape) joined together by twisting.

"Cord" means the product obtained by twisting two or more yarns together.

"Rope" means the product obtained when three or more strands are twisted or braided or placed in a parallel construction to provide a composite article of cordage larger than 4 mm in diameter.

"Yield" means the textile units of measurement establishing the ratio of the length of the final material and its corresponding mass. E.g., denier, m/kg, tex, among others.

The abbreviation "gf/(m/kg)" means the unit of measurement of tenacity whose meaning is: grams-force per meter per kilogram.

In the invention described in this document, a biopolymer was developed using a mixture of poly(lactic acid) (PLA) and polyester-type polymers. The polymers that accompany the PLA, together with other agents commonly used industrially in monofilament and film processing, are present in this product in a percentage that can vary between 6% and 54%. The developed mixture as well as the processing adjusted to it enable the fluidity index and the properties of the resulting product to be ideal for film and monofilament extrusion.

Additionally, this invention presents the use of aliphatic and/or aromatic polyesters capable of plasticizing the PLA, as well as the extrusion process for the production of a material with good mechanical properties necessary for the production of, for example, but not limited to, monofilament, yarns, ropes and cables, cord, meshes and films, and raffia tape.

The incorporation of aliphatic and/or aromatic polyesters, as well as other additives, is done in a ratio between 6% and 54%, more specifically between 25% and 35%, with the remaining material being PLA.

The processing of the mixture is performed in one of the following ways:
1) The biopolymer composed of PLA and aliphatic and/or aromatic polyesters and other agents is processed in a flat-lip extruder with extrusion temperatures ranging from a minimum of 135° C. to a maximum of 190° C., and the film is divided into several tapes, according to the final desired yield. The tapes are stretched in an elongation ratio ranging from a minimum of 1:5 to a maximum of 1:10, preferably 1:6. This operation is intermediated by a heat treatment process that can vary from a minimum of 85° C. to a maximum of 105° C., preferably 95° C. Subsequently, all the tapes are fibrillated in a fibrillator and collected in reels or tubes that can have multiple formats.
2) The biopolymer composed of PLA and aliphatic and/or aromatic polyesters and other agents is processed in a monofilament extruder in a spinneret, with extrusion temperatures ranging from a minimum of 135° C. to a maximum of 180° C., with the number of monofilaments and their m/kg varying, and having cylindrical or oval shapes. The monofilaments obtained are then stretched in an elongation ratio ranging from a minimum of 1:5 to a maximum of 1:12. This operation is intermediated by a heat treatment process involving two phases, one of water/steam, which may range from a minimum of 90° C. to a maximum of 100° C. and the next of heat, with a minimum of 100° C. and a maximum of 120° C. Subsequently, all monofilaments are collected in reels or tubes that can have multiple formats.

OBJECTS OF THE INVENTION

Additionally, the object of this invention consists of the products using a formulation composed of a mixture of PLA with aliphatic and/or aromatic polyesters and other various agents, and the subsequent process for their transformation into monofilaments and films, applicable to the manufacture of yarns, ropes, meshes and nets:
a) Preparation of a mixture of 46% to 94%, preferably 70%, by mass, of PLA, and 6% to 54%, preferably 30%, by mass, of an aliphatic and/or aromatic polyester and other agents;
b) Production of monofilaments with the material obtained in (a), using specific temperature parameters and processing elongation ratios mentioned in the examples;
c) Production of film with the material obtained in (a), using specific temperature parameters and processing elongation ratios mentioned in the examples.

Examples of the objects of the invention are, for example, but not limited to, the final products obtained by processing a mixture of PLA with aliphatic and/or aromatic polyesters and other agents:
Raffia tape, with a yield of 50 to 3,000 m/kg, obtained with the extrusion of a stretched film, fibrillated or not, which enables the production of twisted yarns and stranded cord or rope, with a diameter between 4 mm and 160 mm, up to thirty-six cables and also meshes with a weight between 20 and 310 g/m$^2$, woven on a circular flat loom;
Monofilament, with a yield from 3,000 to 60,000 m/kg, obtained by the extrusion of the biopolymer, subject to specific heat treatment, which enables the production of twisted and braided yarns with a variation and caliber between 0.005 m and 0.16 m and with a minimum of one cable up to a maximum of thirty-six cables or braids;
Monofilament meshes, produced by a circular flat loom weaving process, with a minimum weight of 20 g/m$^2$ and a maximum weight of 310 g/m$^2$. The widths ranged from 0.5 to 6 m with the length being the one desired for the final application;
Nets made of twisted or braided monofilaments with minimum and maximum mesh lengths between knots of 2.08 m and 12 m, respectively, with the possibility of a mesh width of 500 meshes, with the length being the one desired.

Below are a few products and their production process.

A few formulations were tested and processed to understand how the quantity of aliphatic and/or aromatic polyesters influences the processing of the material.

The first sample is a mixture of 50% PLA with 50% aliphatic and/or aromatic polyester and other agents.

The second sample is a mixture of 65% PLA with 35% aliphatic and/or aromatic polyester and other agents.

The third sample is a mixture of 75% PLA with 25% aliphatic and/or aromatic polyester and other agents.

The fourth and final sample is a mixture of 70% PLA with 30% aliphatic and/or aromatic polyester and other agents and was considered the mixture with the ideal ratios.

EXAMPLES

Example 1: 50%-PLA Raffia-Tape Extrusion

A 50%-PLA film (Tg=55-60° C., Tm=145-160° C.) was extruded with 50% aliphatic and/or aromatic polyesters and other agents, with extruder temperatures between 155° C. and 185° C. and then cut into tapes. These tapes were then elongated, with a maximum ratio of 1:6, in a single elongation process at a temperature of 90° C.

Fibrillated tapes of 400 and 1,000 m/kg and twisted yarn were obtained and tested in a laboratory.

| Sample | Meterage (m/kg) | Ultimate tensile strength (kgf) | Elongation (%) | Tenacity (gf/(m/kg)) | Torsion (turns/m) |
| --- | --- | --- | --- | --- | --- |
| Raffia tape | 481.1 | 33.4 | 13.5 | 0.0036999 | NA |
|  | 903.9 | 18.5 | 20.2 | 0.0020467 | NA |
| Twisted yarn | 508.9 | 25.0 | 11.0 | 0.0027707 | 28 |
|  | 1063.0 | 13.6 | 10.8 | 0.0015146 | 40 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Example 2: 65%-PLA Raffia-Tape Extrusion

A 65%-PLA film (Tg=55-60° C., Tm=145-160° C.) was extruded with 35% aliphatic and/or aromatic polyesters and other agents, with extruder temperatures between 155° C. and 185° C. and then cut into tapes. These tapes were then elongated, with a maximum ratio of 1:6.7, in a single elongation process at a temperature of 90° C.

Fibrillated tapes of 500 m/kg and twisted yarn were obtained and tested in a laboratory.

| Sample | Meterage (m/kg) | Ultimate tensile strength (kgf) | Elongation (%) | Tenacity (gf/(m/kg)) | Torsion (turns/m) |
|---|---|---|---|---|---|
| Raffia tape | 587.1 | 21.8 | 6.1 | 0.0024187 | NA |
| Twisted yarn | 575.4 | 28.5 | 10.6 | 0.0031630 | 28 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Example 3: 75%-PLA Raffia-Tape Extrusion

Trial 1

The extrusion of a 75%-PLA film (Tg=55-60° C., Tm=145-160° C.) was tested with 25% aliphatic and/or aromatic polyesters and other agents, with extrusion temperatures between 155° C. and 185° C., and cut into tapes. The resulting tapes were elongated with a 1:7 ratio at a temperature of 90° C.

Fibrillated tapes of 500 m/kg and twisted yarn were obtained and tested in a laboratory.

| Sample | Meterage (m/kg) | Ultimate tensile strength (kgf) | Elongation (%) | Tenacity (gf/(m/kg)) | Torsion (turns/m) |
|---|---|---|---|---|---|
| Raffia tape | 449.2 | 34.1 | 8.6 | 0.0037845 | NA |
| Twisted yarn | 440.9 | 40.5 | 11.4 | 0.0044908 | 28 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Trial 2

The extrusion of a 75%-PLA film (Tg=55-60° C., Tm=145-160° C.) was tested with 25% aliphatic and/or aromatic polyesters and other agents, with extrusion temperatures between 140° C. and 177° C., and cut into tapes. The resulting tapes were elongated with a 1:8.2 ratio at a temperature of 102° C.

Fibrillated tapes of 350 m/kg and twisted yarn were obtained and tested in a laboratory.

| Sample | Meterage (m/kg) | Ultimate tensile strength (kgf) | Elongation (%) | Tenacity (gf/(m/kg)) | Torsion (turns/m) | Knot ultimate tensile strength (kgf) |
|---|---|---|---|---|---|---|
| Raffia tape | 345.5 | 67.4 | 12.4 | 0.0074674 | NA | NA |
| Twisted yarn | 333.0 | 58.8 | 12.3 | 0.0074775 | 30 | 33.3 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Trial 3

The extrusion of a 75%-PLA film (Tg=55-60° C., Tm=145-160° C.) was tested with 25% aliphatic and/or aromatic polyesters and other agents, with extrusion temperatures between 140° C. and 177° C., and cut into tapes. The resulting tapes were elongated with a 1:8.5 ratio at a temperature of 90° C.

Fibrillated tapes of 400 m/kg and twisted yarn were obtained and tested in a laboratory.

| Sample | Meterage (m/kg) | Ultimate tensile strength (kgf) | Elongation (%) | Tenacity (gf/(m/kg)) | Torsion (turns/m) | Knot ultimate tensile strength (kgf) |
|---|---|---|---|---|---|---|
| Raffia tape | 321.0 | 75.0 | 12.5 | 0.0081931 | NA | NA |
| Twisted yarn | 400.0 | 43.9 | 10.6 | 0.0048750 | 30 | 23.0 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Trial 4

The extrusion of a 75%-PLA film (Tg=55-60° C., Tm=145-160° C.) was tested with 25% aliphatic and/or aromatic polyesters and other agents, with extrusion temperatures between 140° C. and 189° C., and cut into tapes. The resulting tapes were elongated with a 1:8 ratio at a temperature of 100° C.

Fibrillated tapes of 400 and 800 m/kg and twisted yarn of 400, 600 and 800 m/kg were obtained and tested in a laboratory.

| Sample | Meterage (m/kg) | Ultimate tensile strength (kgf) | Elongation (%) | Tenacity (gf/(m/kg)) | Torsion (turns/m) | Knot ultimate tensile strength (kgf) |
|---|---|---|---|---|---|---|
| Raffia tape | 370.0 | 62.8 | 13.5 | 0.0069730 | NA | NA |
| | 786.4 | 32.2 | 13.1 | 0.0035732 | NA | NA |
| Twisted yarn | 372.0 | 56.5 | 13.5 | 0.0062903 | 30 | 29.3 |
| | 644.0 | 39.1 | 12.9 | 0.0043478 | 33 | 20.1 |
| | 836.0 | 28.1 | 11.1 | 0.0031220 | 33 | 15.4 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Trial 5

A 75%-PLA film (Tg=55-60° C., Tm=145-160° C.) was extruded with 25% aliphatic and/or aromatic polyesters and other agents, with extruder temperatures between 140° C. and 183° C. and then cut into tapes. These tapes were then elongated, with a maximum ratio of 1:6.8, in a single elongation process at a temperature of 101° C.

Fibrillated tapes of 400, 600 and 800 m/kg and twisted yarn of 800 m/kg were obtained and tested in a laboratory.

| Sample | Meterage (m/kg) | Ultimate tensile strength (kgf) | Elongation (%) | Tenacity (gf/(m/kg)) | Torsion (turns/m) | Knot ultimate tensile strength (kgf) |
|---|---|---|---|---|---|---|
| Raffia tape | 445.9 | 38.6 | 7.1 | 0.0042835 | NA | NA |
| | 637.3 | 27.2 | 7.5 | 0.0030127 | NA | NA |
| | 843.5 | 28.4 | 13.0 | 0.0031535 | NA | NA |
| Twisted yarn | 838.0 | 19.9 | 9.21 | 0.0022076 | | 11.2 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Example 4: 70%-PLA Raffia-Tape Extrusion

Trial 1

A 70%-PLA film (Tg=55-60° C., Tm=145-160° C.) was extruded with 30% aliphatic and/or aromatic polyesters and other agents, with extruder temperatures between 140° C. and 180° C. and then cut into tapes. These tapes were then elongated, with a maximum ratio of 1:8.5, in a single elongation process at a temperature of 102° C.

Fibrillated tapes of 400 and 700 m/kg and twisted yarn were obtained and tested in a laboratory.

| Sample | Meterage (m/kg) | Ultimate tensile strength (kgf) | Elongation (%) | Tenacity (gf/(m/kg)) | Torsion (turns/m) | Knot ultimate tensile strength (kgf) |
|---|---|---|---|---|---|---|
| Raffia tape | 373.9 | 64.5 | 13.4 | 0.0071409 | NA | NA |
| | 732.6 | 35.0 | 13.1 | 0.0038766 | NA | NA |
| Twisted yarn | 367.0 | 58.3 | 13.0 | 0.0064850 | 30 | 27.6 |
| | 731.0 | 28.0 | 10.0 | 0.0031053 | 33 | 15.6 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Trial 2

A 70%-PLA film (Tg=55-60° C., Tm=145-160° C.) was extruded with 30% aliphatic and/or aromatic polyesters and other agents, with extruder temperatures between 140° C. and 183° C. and then cut into tapes. These tapes were then elongated, with a maximum ratio of 1:6.8, in a single elongation process at a temperature of 101° C.

Fibrillated tapes of 400, 600 and 800 m/kg and twisted yarn were obtained and tested in a laboratory.

| Sample | Meterage (m/kg) | Ultimate tensile strength (kgf) | Elongation (%) | Tenacity (gf/(m/kg)) | Torsion (turns/m) | Knot ultimate tensile strength (kgf) |
|---|---|---|---|---|---|---|
| Raffia tape | 414.7 | 38.9 | 7.9 | 0.0043164 | NA | NA |
| | 627.1 | 38.8 | 15.2 | 0.0043055 | NA | NA |
| | 815.4 | 20.8 | 7.9 | 0.0023179 | NA | NA |
| Twisted yarn | 409.0 | 36.0 | 9.7 | 0.0040098 | 30 | 23.3 |
| | 609.0 | 27.5 | 8.8 | 0.0030542 | 30 | 16.1 |
| | 812.0 | 19.4 | 8.0 | 0.0021552 | 33 | 12.9 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Trial 3

A 70%-PLA film (Tg=55-60° C., Tm=145-160° C.) was extruded with 30% aliphatic and/or aromatic polyesters and other agents, with extruder temperatures between 140° C. and 184° C. and then cut into tapes. These tapes were then elongated, with a maximum ratio of 1:6.6, in a single elongation process at a temperature of 96° C.

Fibrillated tapes of 500 and 600 m/kg and twisted yarn of 600 m/kg were obtained and tested in a laboratory.

| Sample | Meterage (m/kg) | Ultimate tensile strength (kgf) | Elongation (%) | Tenacity (gf/(m/kg)) | Knot ultimate tensile strength (kgf) |
|---|---|---|---|---|---|
| Raffia tape | 503.5 | 36.7 | 9.2 | 0.0040715 | NA |
| | 608.6 | 29.6 | 8.1 | 0.0032862 | NA |
| Twisted yarn | 588.0 | 33.5 | 11.0 | 0.0037245 | 19.8 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

Example 5: 70%-PLA Monofilament Extrusion

Monofilaments of 70% PLA with 30% aliphatic and/or aromatic polyesters and other agents were extruded, with extrusion temperatures between 135° C. and 175° C. The resulting monofilaments were elongated with a 1:7 ratio at a temperature of 95° C.

Monofilament samples of 9.490 m/kg were sent for laboratory testing.

| Sample | Meterage (m/kg) | Ultimate tensile strength (kgf) | Elongation (%) | Tenacity (gf/(m/kg)) |
|---|---|---|---|---|
| Monofilament | 8001 | 3.4 | 22.7 | 0.0004249 |

All resistance measurements were carried out with a reference length of 0.25 m in a room with controlled temperature and humidity as defined by ISO 139:2005, i.e., temperature of 20.0° C.±2.0° C. and humidity of 65.0%±4.0%.

CONCLUSIONS

From the results of the tests carried out, taking into account the environmental constraints and requirements that the market demands on similar products and also considering the processability and mechanical resistance of the final product, it is found that the best mixture of PLA and aliphatic and/or aromatic polyesters is the one containing from 65% to 75% PLA by mass.

This mixture enabled obtaining yarns with good results in tensile strength and with the lowest oscillation of values along their length.

The invention claimed is:

1. Process for the preparation of a granulated plasticizing formulation characterized by comprising the following steps:
   a) Preparation of a mixture of 71% to 94% by mass of PLA and 6% to 29% by mass of an aliphatic and/or aromatic polyester and other agents, b) Feeding of said mixture obtained in (a) an extruder with extrusion temperatures ranging from 130° C. to 190° C. and elongation in a ratio ranging from a minimum of 1:5 to a maximum of 1:12 with an intermediate thermal treatment process with temperatures ranging from 85° C. to 120° C.

2. Process for the production of a raffia-tape-type product, characterized by comprising the following steps:
   a) Obtaining the granulated plasticizing formulation claimed in claim 1,
   b) Feeding of a film obtained with the granulated plasticizing formulation of claim 1 in a flat-lip extruder with an extrusion temperature of 135° C. to 190° C.,
   c) Heat treatment of the film with a temperature of 95° C. to 115° C.,
   d) Elongation of the film, with an elongation ratio of 1:5 to 1:10,
   e) Division of the film into several tapes,
   f) Fibrillation of the tapes in a fibrillator,
   g) Collection of the tape in reels.

3. The process of the claim 2, wherein the elongation ratio of the film is 1:6.

4. Process for the production of a monofilament-type product, characterized by comprising the following steps:
   a) Obtaining the granulated plasticizing formulation claimed in claim 1,
   b) Feeding of a monofilament obtained with the granulated plasticizing formulation of claim 1 in a monofilament extruder in a spinneret with an extrusion temperature of 135° C. to 180° C.;
   c) Wet heat treatment of the monofilament, with a temperature of 85° C. to 105° C., followed by a second dry heat treatment, with a temperature of 100° C. to 120° C., between drawing rollers;
   d) Monofilament elongation, in an elongation ratio of 1:5 to 1:12;
   e) Collection of the monofilament in reels.

5. The process of the claim 4, wherein the wet heat treatment of the monofilament is under the temperature of 95° C.

6. The process of the claim 4, wherein the second dry heat treatment of the monofilament is under the temperature of 112° C.

7. The process of the claim 4, wherein the monofilament elongation ratio of the film is 1:7.

8. Raffia-tape-type product characterized by being obtained from the formulation obtained in claim 1, and having a yield from 50 to 3,000 m/kg, a meterage from 321 to 1063.0 m/kg, an ultimate tensile strength from 13.6 to 75.0 kgf, an elongation from 6.1% to 20.2% and a tenacity from 0.0015146 to 0.0081931 gf/(m/kg).

9. Monofilament-type product characterized by being obtained from the formulation obtained in claim 1.

10. Product according to claim 9, characterized by having a yield from 3.000 to 60.000 m/kg.

\* \* \* \* \*